United States Patent Office 3,391,228
Patented July 2, 1968

3,391,228
O,O,O-TRISUBSTITUTED PHOSPHOROTHIOATES
Louis J. Nehmsmann III, Metuchen, and Leslie M. Schenck, Mountainside, N.J., assignors to General Aniline & Film Corporation, New York, N.Y., a corporation of Delaware
No Drawing. Filed Mar. 31, 1964, Ser. No. 356,029
6 Claims. (Cl. 260—951)

ABSTRACT OF THE DISCLOSURE

Surfactants having the following formula:

[RO(R'O)$_{m-1}$(CH$_2$CH$_2$O)$_n$]$_3$P→S wherein R is hydrocarbyl and hydrocarbyl acyl and R' is hydrocarbyl.

---

This invention relates to new and novel surfactants (surface active agents) as well as a process for their manufacture and more particularly to O,O,O-trisubstituted phosphorothioates derived from organic polyoxyalkylene ethers and a process for their manufacture.

An object of this invention is to provide a new and novel class of surfactants, the O,O,O-trisubstituted phosphorothioates having as substituents organic polyoxyalkylene ethers. Another object of the present invention is to provide an improved process for the preparation of O,O,O-trisubstituted phosphorothioates that does not involve use of solvents or purification of intermediates or products. These and other objects of this invention will become apparent as this description proceeds.

The objects of this invention are attained by our discovery that a new class of O,O,O-trisubstituted phosphorothioates which have organic polyoxyalkylene ethers of the type used as nonionic surfactants (surface active agents) as substituents are obtained in quantitative yields by a process is illustrated by Equation 1

(1)
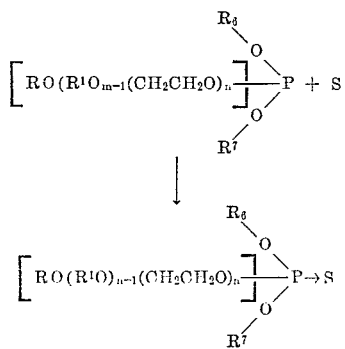

wherein R is a radical containing from 6 to 43 carbon atoms and is a radical selected from the class consisting of alkyl radicals, aryl radicals, alkylaryl radicals, alkylarylmethylene radicals and acyl radicals, R$^1$ is a divalent residue of a vicinal epoxide containing from 2 to 12 carbon atoms, m is an integer of from 1 to 150, n is an integer of from 1 to 150, the sum of m−1 and n is from 1 to 150, and R$^6$ and R$^7$ each represents a residue of an organic polyoxyalkylene ether of the formula:

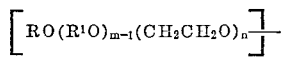

In brief, the process of the present invention is attained by addition of sulfur usually in the form of flowers of sulfur to the desired O,O,O-trisubstituted organic polyoxyalkylene ether phosphite. Reaction is normally carried out with agitation and at a temperature in the range of about 25 to 150° C. Reaction is usually completed within ½ to 1 hour. The degree of completion of reaction is determined by iodometric titration of a sample from the reaction mixture to determine the percent unreacted phosphite. If the sample shows unreacted phosphite is not present, reaction is complete.

Trisubstituted organic oxyalkylene ether phosphites which may be used in the process disclosed in this invention include those phosphites which may be represented by Formula I:

(I)
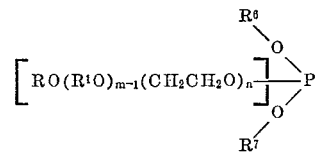

wherein R, R$^1$, m and n have the values assigned above and R$^6$ and R$^7$ each may be alike or different and represents a member selected from the group

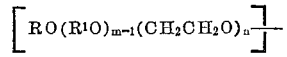

wherein R, R$^1$, m and n also have the values assigned above. Trisubstituted phosphites as represented by Formula I and methods for their preparation are disclosed in the copending application of Schenck, Leary, Nunn and Huber, Ser. No. 333,701 filed Dec. 26, 1963 now abandoned, and in the copending application of Nehmsmann, Nunn and Schenck, Ser. No. 275,222 filed Apr. 24, 1963 now Patent No. 3,277,217 issued Oct. 4, 1966. Triaryl phosphites useful in the preparation of these trisubstituted organic oxyalkylene ether phosphites include among others triphenyl phosphite, tri (o-cresyl) phosphite, tri (m-cresyl) phosphite, tri (p-cresyl) phosphite, tri (2,4-xylenyl) phosphite, tri (2,4-dichlorophenyl) phosphite, tri (hexylphenyl) phosphite, tri (nonylphenyl) phosphite, tri (dinonylphenyl) phosphite, tri (dodecylphenyl) phosphite, tri (2-naphthyl) phosphite, cresyl hexylphenyl phenyl phosphite, their isomers, their mixtures or the like. The complete disclosures and teachings of both of these copending applications are incorporated herein by reference.

Any form of elemental sulfur such as flowers of sulfur, roll sulfur, brimstone, sulfur flour, liquid sulfur or the like may be used. In general, flowers of sulfur or liquid sulfur is used, and refined grades having a purity of not less than 99.8% are employed.

We have discovered that these new phosphorothioates are useful as surfactants. They are low foaming surfactants which have low rewetting values and are useful as surfactants in applications where rewetting is not desirable. This new class of surfactants also has the advantage that even though they contain sulfur, they do not have objectionable odors.

As examples of polyoxyalkylene ethers of organic compounds which may be used in the production of trisubstituted phosphites for use in the process disclosed in this invention, those which are normally employed commercially as nonionic surfactants (surface active agents) are preferred. Nonionic surfactants are well known in the art and have many commercial uses. Such nonionic surfactants may be represented by Formula II (II) 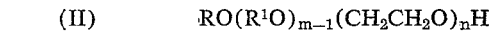

wherein R is an alkyl radical containing from 6 to 28 carbon atoms, an aryl radical containing from 6 to 14 carbon atoms, an alkylaryl radical containing from 7 to 42 carbon atoms, an arylmethylene (benzyl) radical containing from 7 to 43 carbon atoms, an alkylarylmethylene (alkylbenzyl) radical containing from 8 to 43 carbon atoms, or an acyl radical containing from 6 to 30 carbon atoms, R$^1$ is the divalent residue of a vicinal epoxide containing from 2 to 12 carbon atoms, $m$ is an integer of from 1 to 150, $n$ is an integer of from 1 to 150 and the sum of $m-1$ and $n$ is from 1 to 150.

In Formula II, R may be either a straight or branched chain alkyl radical containing from 6 to 28 carbon atoms such as hexyl, octyl, nonyl, decyl, henadecyl, dinonyl, dodecyl, tridecyl, tetradecyl, hexadecyl, heptadecyl, octadecyl, nonadecyl, eicosyl, heneicosyl, docosyl, tricosyl, tetracosyl, pentacosyl, hexacosyl, heptacosyl, myricyl, their isomers, their mixtures or the like. R may also be an aryl radical of from 6 to 14 carbon atoms such as phenyl, diphenyl, naphthyl, 2- and 5-anthryl or the like. Likewise, R may be an alkylaryl radical containing from 7 to 42 carbon atoms such as tolyl (methylphenyl), ethylphenyl, propylphenyl, butylphenyl, diamylphenyl, octylphenyl, nonylphenyl, decylphenyl, dodecylphenyl, tetradecylphenyl, pentadecylphenyl, octadecylphenyl, dinonylphenyl, dioctadecylphenyl, their isomers, their mixtures or the like. R may also be an arylmethylene (benzyl) radical or an alkylarylmethylene radical containing from 7 to 43 carbon atoms such as benzyl, methylbenzyl, nonylbenzyl, diamylbenzyl, didodecylbenzyl, octadecylbenzyl, dioctadecylbenzyl, their isomers, their mixtures or the like. R may be an acyl radical of from 6 to 30 carbon atoms derived from an organic acid such as caproic, caprylic, pelargonic, capric, n-undecylic, lauric, myristic, palmitic, margaric, stearic, arachidic, behenic, lignoceric, cerotic, melissic, oleic, elaidic, linoleic, α-eleostearic, β-eleostearic, α-linolenic, erucic acid, their isomers or the like.

Suitable methods for preparation of these nonionic surfactants are described in U.S. Patents 1,970,578; 2,213,477; 2,575,832; 2,593,112; and 2,676,975. The complete disclosures and teachings of these patents are incorporated herein by reference. In the preparation of these surfactants, straight or branched chain alkyl alcohols, aryl alcohols, or arylmethyl alcohols, and their alkylated derivatives or aliphatic acids may be reacted with the vicinal epoxide either single or in combination with each other.

Suitable vicinal epoxides for use in preparation of these nonionic surfactants include those compounds which can be represented by Formula III (III)

wherein the radicals designated as $R^2$, $R^3$, $R^4$ and $R^5$ individually can be hydrogen and alkyl, alkenyl, aryloxyalkyl, oh the like groups, and two of the radicals designated as $R^2$, $R^3$, $R^4$ and $R^5$ may be taken together to form a cycloalkyl group, preferably wherein the said groups have from 1 to 10 carbon atoms. Thus in Formula II above, the radical $R^1$, which represents the divalent residue of a vicinal epoxide, can be represented by Formula IV (IV)

wherein the radicals $R^2$–$R^5$ have the same values as stated above for Formula III.

Representative groups of vicinal epoxides which can be employed include, among others, the alkylene oxides, the epoxalkenes, the aryloxy-substituted alkylene oxides, the epoxycycloalkanes, and the like which preferably have from 2 to 12 carbon atoms. Specific examples of vicinal epoxides which can be employed include, among others ethylene oxide, 1,2-epoxypropane, the epoxybutanes, 3,4-epoxy-1-butene, the epoxypentanes, 3,4-epoxy-1-pentene, the epoxyhexanes, the epoxyheptanes, the epoxyoctanes, the epoxynonanes, the epoxydecanes, the epoxydodecanes, phenyl glycidyl ether, tolyl glycidyl ether, xylyl glycidyl ether and other alkyl-substituted phenyl glycidyl ethers, epoxycyclohexane and alkyl-substituted epoxycyclohexanes, epoxycyclopentane and alkyl-substituted epoxycyclopentanes, 2,3-epoxybicyclo (2.2.1) heptane, or the like. Preferred vicinal epoxides include alkylene oxides such as ethylene oxide, 1,2-epoxypropane, the epoxybutanes, or the like. Thus, in one preferred embodiment of the invention, when an alkylene oxide is employed, Formula IV can be represented as —$C_aH_{2a}$— wherein $a$ has a value of from 2 to 12.

When nonionics are produced by reaction with vicinal epoxides containing more than 2 carbon atoms, these surfactants should be reacted with at least 1 mole of ethylene oxide per mole of nonionic surfactant before they are employed in the present invention so that the polyoxyalkylene chain is terminated with a hydroxyl attached to the divalent residue of an ethylene oxide molecule. The number of moles of ethylene oxide which may be used in the manufacture of these nonionic surfactants may vary from 1 to 150 moles per mole of hydroxylic compound (phenol, aliphatic acid or alcohol compound).

As examples of hydroxylic compounds which may be used in the process disclosed by this invention, there may be mentioned these polyoxyalkylated derivatives of phenol and alkylphenols in which the total number of alkyl carbon atoms on the phenol molecule is from 1 to 36, those derivatives of aliphatic alcohols containing from 6 to 28 carbon atoms as well as those of benzyl alcohol and alkylbenzyl alcohols in which the total number of alkyl carbon atoms is from 1 to 36 and aliphatic acids in which the total number of carbon atoms is from 6 to 30.

As examples of such alkylphenols there may be mentioned hexylphenols, heptylphenols, octylphenols, nonylphenols, decylphenols, dodecylphenols, tridecylphenols, octadecylphenols, their mixtures or their isomers. The polyoxyalkylated derivatives of secondary alkylphenols obtained by alkylation of phenols or cresols with α-olefins of the types obtained by the condensation of ethylene in the presence of Ziegler type catalysts or by wax cracking techniques are of particular value. α-Olefins useful in the preparation of these alkylphenols may contain odd or even numbers of carbon atoms. Mixtures of α-olefins having various ranges of carbon atoms such as $C_6$–$C_7$, $C_7$–$C_9$, $C_7$–$C_{11}$, $C_9$–$C_{11}$, $C_{11}$–$C_{15}$, $C_{15}$–$C_{20}$ and higher may be used in the preparation of these alkylphenols. Olefins containing even numbers of carbon atoms such as those derived from fats may be employed. Alkylphenols such as m-pentadecylphenols may also be used. The polyoxyalkylated derivatives of alkylphenols obtained by alkylation of phenol or cresol with dimers, trimers, tetramers, or the like of lower molecular weight olefins, such as propylene, butylene, amylene, their isomers or their mixtures may also be used. Likewise, di- and tri-substituted alkylphenols obtained by alkylation of the above-mentioned alkylphenols may be used. As examples of such di and trialkylphenols, there may be mentioned nonylcresol, diamylphenol, diiocylphenol, dinonylcresol, tri-t-butylphenol, trinonylphenol, di-octadecylphenol or the like.

The polyoxyalkylene ethers of alcohols containing from 5 to 28 carbon atoms are another preferred group of nonionic surfactants which may be employed in the production of trisubstituted phosphites in the present invention. These include the polyoxyalkylene ethers of hexyl alcohol, octyl alcohol, decyl alcohol, dodecyl alcohol, tridecyl alcohol, hexadecyl alcohol, octadecyl alcohol, docosyl alcohol, heptacosyl alcohol, myricyl alcohol, their isomers, their mixtures or the like. Ethers of secondary alcohols such as 2-octanol, 2-tetradecanol, 2-hexadecanol or the like may also be used. Alcohols useful in the preparation of these ethers may be produced by a variety of methods. For example, they may be prepared by the hydrogenation of fatty acids or glycerides. They may be prepared by the oxo process. They may also be prepared by the Ziegler process as described in Kirk-Othmer, "Encyclopedia of Chemical Technology," vol. 1, p. 540 (John Wiley & Sons, New York, N.Y., 2 ed., 1963).

Benzyl alcohol and alkylbenzyl alcohols in which the total number of alkyl carbon atoms is from 1 to 36 may also be used in the preparation of nonionic surfactants which may be converted to trisubstituted phosphites for use in this invention. Specific examples of benzyl alcohols which may be employed include among others, benzyl alcohol, p-methylbenzyl alcohol, o-ethylbenzyl alcohol, propylbenzyl alcohol, i-propylbenzyl alcohol, t-butylbenzyl alcohol, s-pentylbenzyl alcohol, n-hexylbenzyl alcohol, octylbenzyl alcohol, nonylbenzyl alcohol, dodecylbenzyl alcohol, tridecylbenzyl alcohol, octadecylbenzyl alcohol, their isomers, their mixtures or the like.

The polyoxyalkylene ethers of organic acids in which the total number of carbon atoms in the acid is from 6 to 30 are another group of nonionic surfactants which may be employed in production of trisubstituted phosphites for use in the present invention. This group includes the polyoxyalkylene ethers of caproic acid, caprylic acid, pelargonic acid, capric acid, n-undecylic acid, lauric acid, myristic acid, palmitic acid, margaric acid, stearic acid, arachidic acid, behenic acid, lignoceric acid, cerotic acid, melissic acid, oleic acid, elaidic acid, linoleic acid, α-eleostearic acid, β-eleostearic acid, α-linolenic acid, erucic acid, their isomers or the like.

The following examples of nonionic surfactants may be employed in the manufacture of trisubstituted phosphites for use as intermediates in the process described by this invention. In these examples, E.O. represents ethylene oxide, Pr. O. propylene oxide, Bu. O. butylene oxide, Oc. O. octylene oxide, St. O. styrene oxide, Dd. O. dodecylene oxide, and the number immediately preceding each of these formulas refers to the number of moles of the oxide thereof reacted with one mole of the reactive hydrogen containing organic compound. Such nonionic surfactants include phenol+1E.O., phenol+5Bu.O.+1E.O., o-cresol+1Pr.O.+2E.O., diisobutylphenol+9E.O., nonylphenol+6E.O., diamylphenol+8E.O., dodecylphenol+2E.O., diamylphenol+1St.O.+10E.O., hexylphenol+4E.O., octadecylphenol+20E.O., dioctadecylphenol+150E.O., lauryl alcohol+4E.O., isooctyl alcohol (oxo alcohols)+5E.O., decyl alcohol (oxo alcohols)+50Pr.0+100E.O., tridecyl alcohol (oxo alcohols)+50E.O., tallow alcohol+30E.O., stearyl alcohol+70E.O., t-butylphenol+1Oc.O.+18E.O., phenol+1Dd.O+12E.O., n-hexyl alcohol+1St.O+11E.O., lauryl alcohol (Ziegler process)+15Pr.O.+20E.O., oleyl alcohol+40E.O., m-pentadecylphenol+90E.O., methyl alcohol+1E.O., acetic acid+1E.O., oleic acid+150E.O., dichlorophenol+3E.O., chlorobutanol+2E.O. and stearic acid+13E.O., or the like.

It is to be understood that in some applications use of nonionics derived from mixtures of alkylphenols or alcohols may be beneficial. Such mixtures may include alkylation mixtures containing alkylphenols and unreacted olefins, alkylphenol mixtures which have been stripped to remove unreacted olefins, residues of alkylation mixtures containing high boiling alkylphenols, crude alcohol mixtures, alcohol mixtures containing dissimilar alcohols, mixtures of alcohols and phenols or the like. Advantages of these compositions as hydrophobes for nonionics are well known to those skilled in the art. Frequently, such mixtures have unique and improved surfactant properties. As further examples of such compositions which may be used to prepare polyalkoxylated derivatives, there may be mentioned mixtures of nonylphenol, still bottoms from dodecylphenol alkylations, crude alcohol mixtures obtained from hydrogenation of natural products such as vegetable or animal oils or alkoxylated mixtures obtained from the commercial synthetic alcohol processes.

The following examples illustrate preferred embodiments of the process disclosed by this invention. These examples are only illustrative of the invention and are not to be regarded as limitative. It will be understood that all parts, percentages and proportions referred to herein and in the appended claims are by weight unless otherwise indicated.

Example 1

Tri (nonylphenol+9 E.O.) phosphite, 500 g. (0.27 m.) is charged to a 1-liter 4-neck flask equipped with thermometer and agitator. The charge is heated 90° C. and 8.65 g. sulfur (0.27 m.) is added with agitation over 5 minutes. This reaction mixture is stirred for 30 minutes or until all of the sulfur is reacted. Analysis shows that the product does not contain any unreacted phosphite ester and that the product is O,O,O-tri (nonylphenol+9 E.O.) phosphorothioate. The product has a surface tension at 0.1% of 38.3 dynes/cm. at .01% of 42.2 dynes/cm. and at .001% of 46.9 dynes/cm. At a concentration of .05%, the product has a Ross Miles Foam of 15 mm. at 0 minutes and 10 mm. after 5 minutes. At a concentration of 0.1%, the product has a Draves Wetting of over 300 seconds at 25° C. and 252 seconds at 70° C. The trisubstituted phosphites used in this example and the following examples are prepared by the method disclosed in copending application Ser. No. 333,701, filed Dec. 26, 1963.

Example 2

Tris (oleyl alcohol+7 E.O.) phosphite, 500 g. (0.29 m.) and sulfur 9.3 g. (0.29 m.) are charged into a 3-neck 1-liter flask equipped with an agitator and thermometer. This mixture is reacted with agitation at 50° C. for six hours. Analysis of the product by iodometric titration shows that it does not contain any unreacted phosphite ester. A yield of 509 g. of O,O,O-tri (oleyl alcohol+7 E.O.) phosphorothioate is obtained.

Example 3

Into a flask equipped as described in Example 1, 682 g. (1.0 m.) tris (octyl alcohol+2 E.O.) phosphite and 32.0 g. (1.0 m.) sulfur are charged. This reaction mixture is then stirred at 100° C. for three hours. Analysis shows a yield of 714 g. of O,O,O-tris (octyl alcohol+2 E.O.) phosphorothioate.

Example 4

Operating as in Example 1, 500 g. (0.024 m.) tris (octadecylphenol+150 E.O.) phosphite and 0.77 g. (0.024 m.) sulfur are charged into a 1-liter flask equipped with thermometer and agitator. This reaction mixture is stirred at 150° C. for 1 hour. Analysis shows a quantitative yield of O,O,O-tri (octadecylphenol+150 E.O.) phosphorothioate is obtained. The product has a surface tension of 43 dynes/cm. at 0.1% concentration in water.

Example 5

Into a 1-liter 4-neck flask equipped as described in Example 1 is charged 674 g. (0.5 m.) tri (nonylphenol+5 E.O.) phosphite and 16.0 g. (0.5 m.) sulfur. The reactants are stirred at 150° C. for 15 minutes. Analysis shows 690 g. of O,O,O-tri (nonylphenol+5 E.O.) phosphorothioate is obtained. Presence of the thioate radical is verified by sulfur analysis and absence of phosphite by iodometric titration.

Example 6

Operating as in Example 1, a flask is charged with 585 g. (0.64 m.) tris-(o-cresol+2 Bu.O.+1 E.O.) phosphite and 20.5 g. (0.64 m.) sulfur. Analysis shows a quantitative yield of O,O,O-tris-(o-cresol+2 Bu.O.+1 E.O.) phosphorothioate is obtained.

Example 7

Proceeding as in Example 1, 472 g. (.179 m.) of tri-(dinonylphenol+10 P.O.+1 E.O.) phosphite is substituted for tri(nonylphenol+9 E.O.) phosphite. A yield of 477.7 g. of O,O,O-tri(dinonylphenol+10 P.O.+1 E.O.) phosphorothioate is obtained by heating the phosphite with 5.7 g. (0.179 m.) sulfur for one hour at 100° C.

Example 8

A charge of 500 g. (0.27 m.) of tri(dichlorophenol+10

E.O.) phosphite and 8.65 g. (0.27 m.) sulfur are heated at 125° C. with agitation for two hours. A quantitative yield of O,O,O-tri(dichlorophenol+10 E.O.) phosphorothioate is obtained.

Example 9

495 g. (0.34 m.) of (lauryl alcohol+1 E.O.) (octylphenol+3 E.O.) (tridecyl alcohol+15 E.O.) phosphite, a trisubstituted phosphite, is charged to a 1-liter flask equipped as in Example 1 and heated to 150° C. for one hour with 10.9 g. (0.34 m.) sulfur. Analysis shows a quantitative yield of the corresponding thiophosphate is obtained and that the product does not contain phosphites or hydrolysis byproducts.

Example 10

Operating as in Example 1, 585 g. (0.64 m.) of tri(o-cresol+2 Bu.O.+1 E.O.) phosphite and 20.5 g. (0.64 m.) sulfur are charged. Analysis shows the reaction gives a quantitative yield of tri(o-cresol+2 Bu.O.+1 E.O.) thiophosphate.

O,O,O-trisubstituted phosphorothioates derived from organic oxyalkylene ethers have many useful applications as surfactants. For example, they may be employed as emulsifiers or wetting agents in latices where rewetting is not desired. These esters may also be employed as grinding aids and dispersants for pigments. They may be used as emulsifiers for biocides such as DDT, Parathion, Malathion or the like. These products are also useful as emulsifiers in latex and emulsion paints. They may also be used in combination with other surfactants such as nonionics, anionics and cationics as well as with builders, or fillers (e.g. sodium silicates, sodium phosphates, carbonates, sulfates, borax and the like), solvents and the like in the formulation of products useful as detergents, emulsifiers and dispersants.

This invention has been disclosed with respect to certain preferred embodiments. Various modifications and variations thereof will become obvious to persons skilled in the art. It is to be understood that such modifications and variations are to be included within the spirit and scope of this invention.

What is claimed is:

1. A surfactant composition having the Formula I (I)
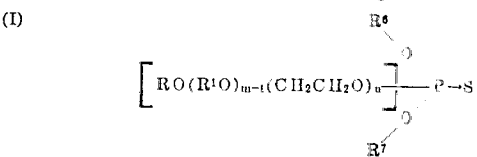

wherein R is a radical containing from 6 to 43 carbon atoms and is selected from a class consisting of alkyl radicals, aryl radicals, alkylaryl radicals, benzyl radicals, alkylbenzyl radicals and acyl radicals, $R^1$ is a divalent residue of a vicinal epoxide containing from 2 to 12 carbon atoms, $m$ is an integer of from 1 to 150, $n$ is an integer of from 1 to 150, the sum of $m-1$ and $n$ is from 1 to 150 and $R^6$ and $R^7$ are residues of representative members of the group

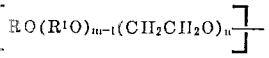

wherein R, $R^1$, $m$ and $n$ have the values assigned above.

2. A surfactant composition as defined in claim 1 wherein R is a nonylphenyl radical, $R^1$ is a divalent residue of an epoxide containing 2 carbon atoms, $m$ is 1, $n$ is 1, the sum of $m-1$ and $n$ is 1, $R^6$ and $R^7$ are residues of the organic polyoxyalkylene ether shown in Formula I and defined as above.

3. A surfactant composition as defined in claim 1 wherein R is an alkyl radical containing an average of 12 carbon atoms, $R^1$ is a divalent residue of a vicinal epoxide containing 2 carbon atoms, $m$ is 1, $n$ is 10, the sum of $m-1$ and $n$ is 10 and $R^6$ and $R^7$ are residues of the organic polyoxyalkylene ether shown in Formula I and defined as above.

4. A surfactant composition as defined in claim 1 wherein R is a dodecylphenyl radical, $R^1$ is a divalent residue of a vicinal epoxide containing 3 carbon atoms, $m$ is 50, $n$ is 101, the sum of $m-1$ and $n$ is 150 and $R^6$ $R^7$ are residues of the organic polyoxyalkylene ether shown in Formula I and defined as above.

5. A surfactant composition as defined in claim 1 wherein R is a tridecyl radical, $R^1$ is a divalent residue of a vicinal epoxide containing 2 carbon atoms, $m$ is 1, $n$ is 13, the sum of $m-1$ and $n$ is 13 and $R^6$ and $R^7$ are residues of the organic polyoxyalkylene ether shown in Formula I and defined as above.

6. A surfactant composition as defined in claim 1 having the formula

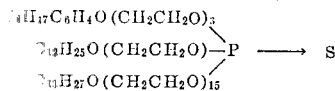

wherein $C_8H_{17}C_6H_4-$ is an octylphenyl radical, $C_{12}H_{25}-$ is a lauryl radical and $C_{13}H_{27}-$ is a tridecyl radical.

References Cited

UNITED STATES PATENTS 3,005,003    10/1961    Ford-Moore ____ 260—985 XR

OTHER REFERENCES

Kosolapoff, "Organophosphorus Compounds," J. Wiley & Sons, Inc., New York (1950), pp. 235–6.

CHARLES B. PARKER, *Primary Examiner.*

A. H. SUTTO, *Assistant Examiner.*